US012444530B2

(12) United States Patent
Sato et al.

(10) Patent No.: US 12,444,530 B2
(45) **Date of Patent: *Oct. 14, 2025**

(54) MULTILAYER COIL COMPONENT

(71) Applicant: TDK CORPORATION, Tokyo (JP)

(72) Inventors: Hidekazu Sato, Tokyo (JP); Takahiro Sato, Tokyo (JP); Hitoshi Kudo, Tokyo (JP); Takashi Endo, Tokyo (JP); Yusuke Nagai, Tokyo (JP); Tatsuro Suzuki, Tokyo (JP); Hiroko Korikawa, Tokyo (JP); Kenji Komorita, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/367,503

(22) Filed: Sep. 13, 2023

(65) Prior Publication Data

US 2023/0420172 A1 Dec. 28, 2023

Related U.S. Application Data

(63) Continuation of application No. 16/666,555, filed on Oct. 29, 2019, now Pat. No. 11,810,704.

(30) Foreign Application Priority Data

Oct. 30, 2018 (JP) ................................ 2018-204162

(51) Int. Cl.
*H01F 17/00* (2006.01)
*H01F 5/00* (2006.01)
(Continued)

(52) U.S. Cl.
CPC ......... *H01F 17/0013* (2013.01); *H01F 5/003* (2013.01); *H01F 17/04* (2013.01);
(Continued)

(58) Field of Classification Search
CPC ...... H01F 17/0013; H01F 5/003; H01F 17/04; H01F 27/2804; H01F 27/292
(Continued)

(56) References Cited

U.S. PATENT DOCUMENTS 6,466,120 B1 10/2002 Tokuda et al.
7,375,977 B2 5/2008 Maeda et al.
(Continued)

FOREIGN PATENT DOCUMENTS

CN 1427654 A 7/2003
CN 101809772 A 8/2010
(Continued)

*Primary Examiner* — Shawki S Ismail
*Assistant Examiner* — Joselito S. Baisa
(74) *Attorney, Agent, or Firm* — Oliff PLC

(57) ABSTRACT

A multilayer coil component includes an element body having a multilayer structure including a first element body portion formed of a ferrite element body material, and a second element body portion laminated on the first element body portion and formed of a ferrite element body material having a composition different from the ferrite element body material forming the first element body portion, a multilayer coil having an axis parallel to a lamination direction of the element body, and a stress alleviation portion provided in an inner region of the multilayer coil when viewed from the lamination direction. In the multilayer coil component, the stress alleviation portion is provided in the inner region of the multilayer coil in which a stress tends to be concentrated to alleviate the stress in the inner region of the multilayer coil, and thereby occurrence of cracking in the element body can be suppressed.

11 Claims, 6 Drawing Sheets

(51) Int. Cl.
*H01F 17/04* (2006.01)
*H01F 27/28* (2006.01)
*H01F 27/29* (2006.01)
*H01F 41/04* (2006.01)

(52) U.S. Cl.
CPC ....... *H01F 27/2804* (2013.01); *H01F 27/292* (2013.01); *H01F 41/046* (2013.01)

(58) Field of Classification Search
USPC .................................................. 336/200, 234
See application file for complete search history.

(56) References Cited

U.S. PATENT DOCUMENTS

| | | | | |
|---|---|---|---|---|
| 8,410,887 | B2 | 4/2013 | Nanjyo et al. | |
| 9,041,491 | B2 * | 5/2015 | Sato | H01G 4/012 361/278 |
| 10,984,939 | B2 | 4/2021 | Endo et al. | |
| 11,705,271 | B2 * | 7/2023 | Shimizu | H01F 17/04 336/221 |
| 11,810,704 | B2 * | 11/2023 | Sato | H01F 17/0013 |
| 11,901,105 | B2 * | 2/2024 | Hiraki | H01F 27/2804 |
| 2003/0143428 | A1 | 7/2003 | Kim et al. | |
| 2008/0186125 | A1 * | 8/2008 | Yamamoto | H01F 17/0013 336/200 |
| 2009/0051476 | A1 | 2/2009 | Tada et al. | |
| 2010/0244679 | A1 | 9/2010 | Fujita et al. | |
| 2010/0278203 | A1 | 11/2010 | Lell et al. | |
| 2011/0128109 | A1 | 6/2011 | Tada et al. | |
| 2012/0094784 | A1 | 4/2012 | Hebert et al. | |
| 2012/0172997 | A1 | 7/2012 | Thorwarth et al. | |
| 2013/0093557 | A1 | 4/2013 | Odahara | |
| 2013/0270745 | A1 | 10/2013 | Hebert et al. | |
| 2013/0335184 | A1 | 12/2013 | Hahn et al. | |
| 2014/0253276 | A1 * | 9/2014 | Iwasaki | H01F 27/2804 336/200 |
| 2015/0182813 | A1 | 7/2015 | Hebert et al. | |
| 2016/0354208 | A1 | 12/2016 | Thorwarth et al. | |
| 2017/0025220 | A1 | 1/2017 | Nakaniwa | |
| 2017/0287620 | A1 * | 10/2017 | Miyoshi | H01F 41/041 |
| 2017/0345552 | A1 | 11/2017 | Nakano et al. | |
| 2018/0012698 | A1 * | 1/2018 | Nakatsuji | H01F 27/2804 |
| 2019/0198232 | A1 | 6/2019 | Sato et al. | |
| 2019/0311832 | A1 * | 10/2019 | Tanabe | H05K 3/4629 |
| 2021/0272733 | A1 * | 9/2021 | Hiraki | H01F 27/292 |
| 2021/0304454 | A1 * | 9/2021 | Sasaki | G09G 3/2003 |
| 2024/0428975 | A1 * | 12/2024 | Hiraki | H01F 17/0013 |

FOREIGN PATENT DOCUMENTS

| | | | | |
|---|---|---|---|---|
| CN | 101847692 | A | 9/2010 | |
| CN | 102580291 | A | 7/2012 | |
| CN | 102958470 | A | 3/2013 | |
| JP | 3228790 | B2 | 11/2001 | |
| JP | 2008130736 | A | 6/2008 | |
| JP | 2008-258525 | A | 10/2008 | |
| JP | 2012182285 | A | 9/2012 | |
| JP | 2014187276 | A | 10/2014 | |
| JP | 5929052 | B2 | 6/2016 | |
| JP | 2017-212372 | A | 11/2017 | |
| JP | 6407400 | B1 | 10/2018 | |
| KR | 101550591 | B1 * | 9/2015 | H01F 5/06 |
| KR | 20200116237 | A * | 10/2020 | H01F 27/29 |
| TW | 201324555 | A | 6/2013 | |
| WO | 2007/088914 | A1 | 8/2007 | |
| WO | 2013035516 | A1 | 3/2013 | |
| WO | 2015156051 | A1 | 10/2015 | |
| WO | 2015174124 | A1 | 11/2015 | |
| WO | 2018225445 | A1 | 12/2018 | |

* cited by examiner

MULTILAYER COIL COMPONENT

CROSS-REFERENCE TO RELATED APPLICATIONS

This application is a continuation of U.S. application Ser. No. 16/666,555, filed Oct. 29, 2019.

This application is based upon and claims the benefit of priority from Japanese Patent Application No. 2018-204162, filed on 30 Oct. 2018 and U.S. patent application Ser. No. 16/666,555, filed on 29 Oct. 2019, the entire contents of which are incorporated herein by reference.

TECHNICAL FIELD

The disclosure relates to a multilayer coil component.

BACKGROUND

Conventionally, a multilayer coil component having a multilayer coil provided in a magnetic element body is known. For example, a magnetic element body having a multilayer structure in which oxide magnetic bodies of two types having different material compositions are laminated and the two oxide magnetic bodies are integrally sintered is disclosed in Japanese Patent No. 3228790 (Patent Document 1).

As in the multilayer coil component according to the conventional technology described above, when an element body is formed by laminating element body portions of a plurality of types having different material compositions and a coil is provided in the element body, coil characteristics of impedance, inductance, and a self-resonant frequency (SRF) can be adjusted.

SUMMARY

However, since compositions of respective materials forming a plurality of element body portions are different, and thus since a difference in shrinkage ratio arises between the plurality of element body portions, and shrinkage ratios between coils in the respective plurality of element body portions are also different, cracking may occur in the element body.

According to the disclosure, a multilayer coil component in which cracking is suppressed is provided.

A multilayer coil component according to one aspect of the disclosure includes an element body having a multilayer structure having a first element body portion formed of a first material, and a second element body portion laminated on the first element body portion and formed of a second material having a composition different from that of the first material, a multilayer coil having an axis parallel to a lamination direction of the element body, and a stress alleviation portion provided in an inner region of the multilayer coil when viewed from the lamination direction.

In the above-described multilayer coil component, a stress caused by a difference in shrinkage ratio between the first element body portion, the second element body portions, and the multilayer coil tends to be concentrated in the inner region of the multilayer coil when viewed from the lamination direction. In the above-described multilayer coil component, the stress alleviation portion is provided in the inner region of the multilayer coil in which the stress tends to be concentrated to alleviate the stress in the inner region of the multilayer coil, and thereby occurrence of cracking in the element body can be suppressed.

In a multilayer coil component according to another aspect of the disclosure, the element body has a multilayer structure in which one of the first element body portions and the second element body portions sandwich the other thereof in the lamination direction.

A multilayer coil component according to another aspect of the disclosure further includes an intermediate layer formed of a mixed composition material including the first material and the second material between the first element body portion and the second element body portion.

In a multilayer coil component according to another aspect of the disclosure, the stress alleviation portion is in contact with the intermediate layer in the lamination direction.

In a multilayer coil component according to another aspect of the disclosure, the stress alleviation portion is a slit layer.

In a multilayer coil component according to another aspect of the disclosure, the stress alleviation portion is provided only in the inner region of the multilayer coil when viewed from the lamination direction.

In a multilayer coil component according to another aspect of the disclosure, the stress alleviation portion is provided on a coil axis of the multilayer coil.

DETAILED DESCRIPTION

Hereinafter, an embodiment of the disclosure will be described in detail with reference to the accompanying drawings. In the description of the drawings, the same elements or elements having the same functions will be denoted by the same reference signs and duplicate descriptions thereof will be omitted.

Figure 1:
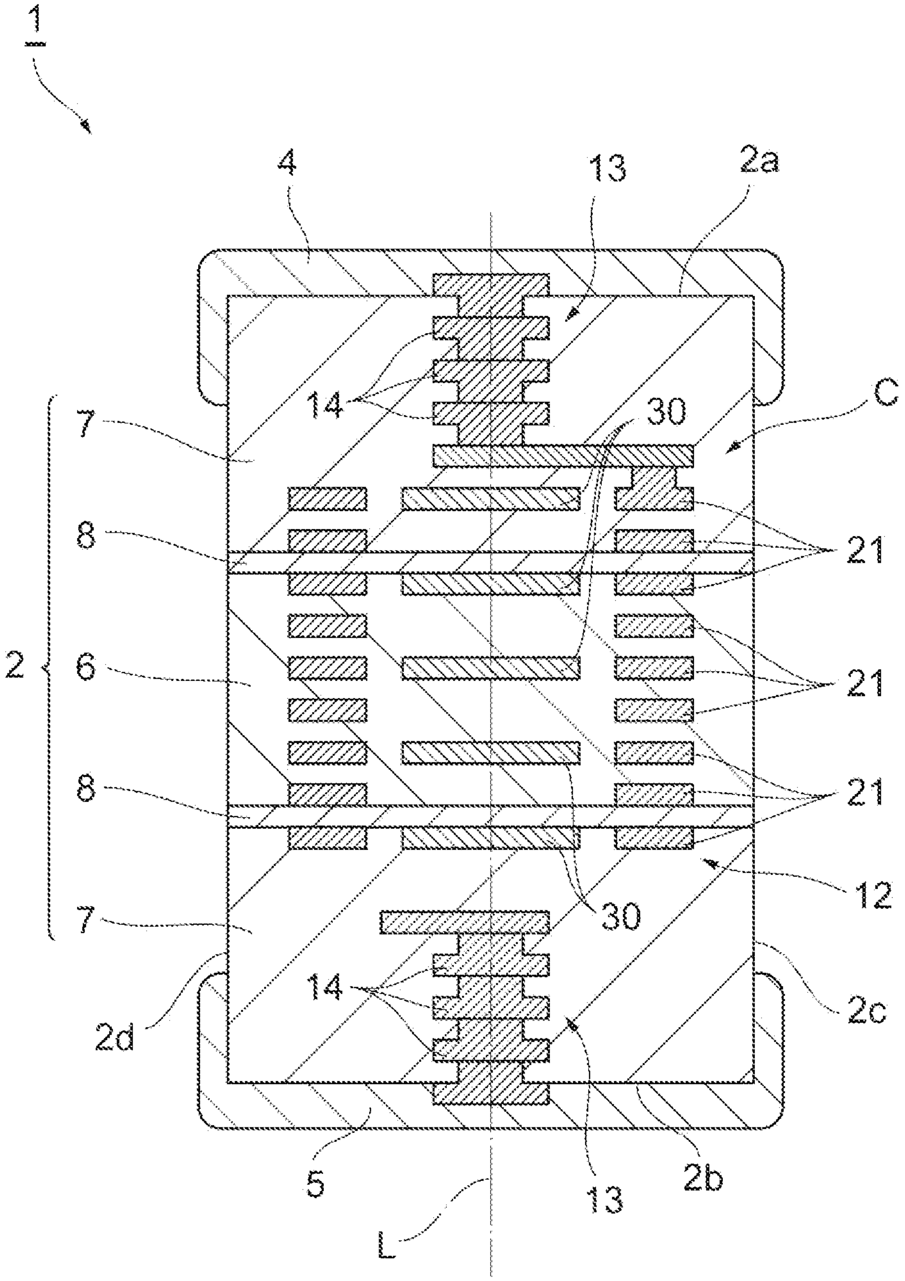
FIG. 1 is a schematic cross-sectional view illustrating a multilayer coil component according to one embodiment.

As illustrated in FIG. 1, a multilayer coil component 1 according to the embodiment includes an element body 2, and a multilayer coil C formed in the element body 2.

The element body 2 is formed of a ferrite element body material containing ferrite as a main component and can be formed by calcining a laminate in which multi-layered green sheets 11A, 11B, and 11C to be described below are overlapped. Therefore, the element body 2 can be regarded as a laminate of ferrite layers and has a lamination direction. However, the ferrite layers constituting the element body 2 can be integrated to such an extent that boundaries therebetween cannot be visually recognized. The element body 2 has an outer shape of a substantially rectangular parallelepiped shape, and includes, as outer surfaces thereof, a pair of end surfaces 2*a* and 2*b* facing each other in the lamination direction and four side surfaces 2$c$, 2$d$, 2$e$, and 2$f$ extending in a direction in which the pair of end surfaces 2$a$ and 2$b$ face each other to connect the pair of end surfaces 2$a$ and 2$b$.

Figure 2:
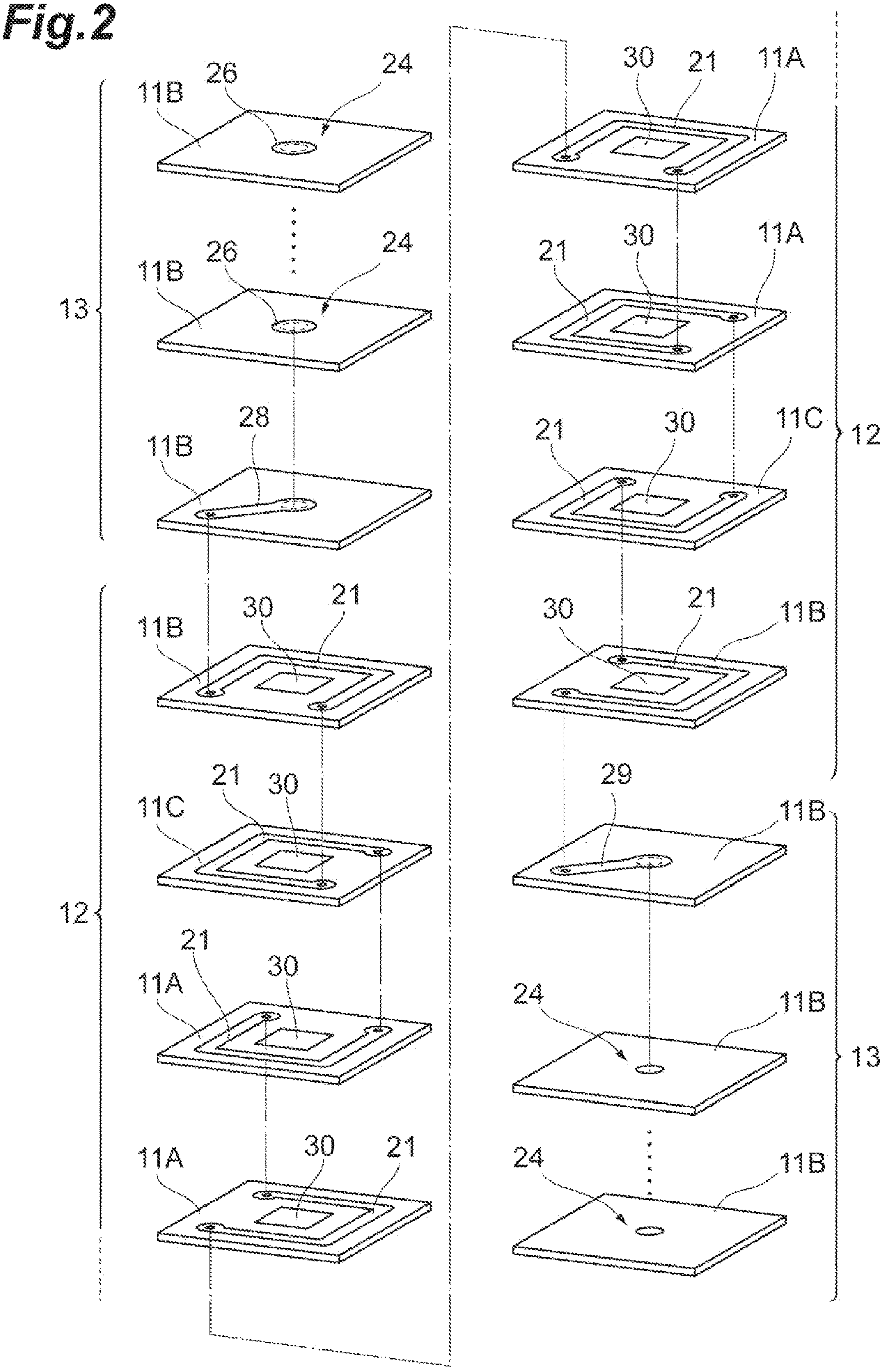
FIG. 2 is a perspective view illustrating a lamination state of green sheets when the multilayer coil component illustrated in FIG. 1 is manufactured.
Figure 3A:
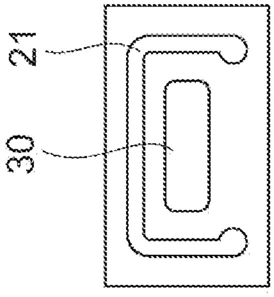
FIGS. 3A to 3D are plan views illustrating a conductor pattern and a slit layer in each layer of the multilayer coil component illustrated in FIG. 1.
Figure 3B:
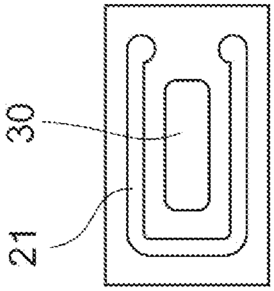
Figure 3C:
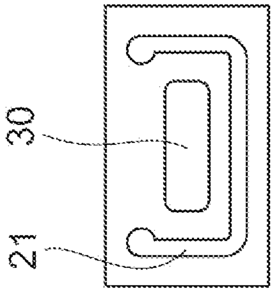
Figure 3D:
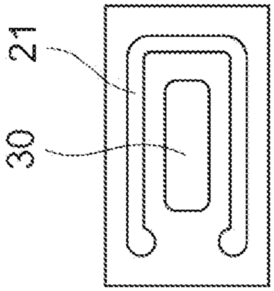

As illustrated in FIG. 2, the element body 2 includes a first element body portion 6 and a pair of second element body portions 7. More specifically, the element body 2 has a structure (a sandwich structure) in which the first element body portion 6 is adjacent to the pair of second element body portions 7 to be sandwiched therebetween in a lamination direction of the element body 2. The element body 2 includes a pair of intermediate layers 8 interposed between the first element body portion 6 and the second element body portions 7 in the lamination direction of the element body 2.

In the present embodiment, both the first element body portion 6 and the second element body portions 7 are formed of a ferrite element body material containing a Ni—Cu—Zn-based ferrite as a main component, but compositions of the ferrite element body materials are different from each other. Specifically, the ferrite element body material (a first material) forming the first element body portion 6 contains main components composed of 45.0 mol % of Fe compounds in terms of $Fe_2O_3$, 8.0 mol % of Cu compounds in terms of CuO, 8.0 mol % of Zn compounds in terms of ZnO, and the remainder being Ni compounds, and contains accessory components including 1.0 part by weight of Si compounds in terms of $SiO_2$, 5.0 parts by weight of Co compounds in terms of $Co_3O_4$, and 0.8 parts by weight of Bi compounds in terms of $Bi_2O_3$ with respect to 100 parts by weight of the main components. Also, the ferrite element body material (a second material) forming the second element body portions 7 contains main components composed of 37.0 mol % of Fe compounds in terms of $Fe_2O_3$, 8.0 mol % of Cu compounds in terms of CuO, 34.0 mol % of Zn compounds in terms of ZnO, and the remainder being Ni compounds, and contains accessory components including 4.5 parts by weight of Si compounds in terms of $SiO_2$, 0.5 parts by weight of Co compounds in terms of $Co_3O_4$, and 0.8 parts by weight of Bi compounds in terms of $Bi_2O_3$ with respect to 100 parts by weight of the main components. That is, both the first element body portion 6 and the second element body portions 7 contain ZnO as the constituent component, and a ZnO content of the first element body portion 6 is lower than a ZnO content of the second element body portions 7. Also, both the first element body portion 6 and the second element body portions 7 contain NiO as a constituent component, and an NiO content of the first element body portion 6 is higher than an NiO content of the second element body portions 7.

Further, the ferrite element body material forming both the first element body portion 6 and the second element body portions 7 contains $Zn_2SiO_4$ as an accessory component. In the present embodiment, a $Zn_2SiO_4$ content of the first element body portion 6 is 1 part by weight with respect to 100 parts by weight of the ferrite element body material, and a $Zn_2SiO_4$ content of the second element body portions 7 is 17 parts by weight with respect to 100 parts by weight of the ferrite element body material. That is, the $Zn_2SiO_4$ content of the first element body portion 6 is lower than the $Zn_2SiO_4$ content of the second element body portions 7.

Further, a dielectric constant of the second element body portions 7 is lower than a dielectric constant of the first element body portion 6. In the present embodiment, a dielectric constant of the first element body portion 6 is about 14, and a dielectric constant of the second element body portions 7 is about 12. Also, a magnetic permeability of the second element body portions 7 is higher than a magnetic permeability of the first element body portion 6. In the present embodiment, a magnetic permeability of the first element body portion 6 is about 6, and a magnetic permeability of the second element body portions 7 is about 11.

In the present embodiment, both the intermediate layers 8 are formed of a ferrite element body material containing a Ni—Cu—Zn-based ferrite as a main component, and are formed of a mixed composition material including the ferrite element body material forming the first element body portion 6 and the ferrite element body material forming the second element body portions 7. As an example, the ferrite element body material forming the first element body portion 6 and the ferrite element body material forming the second element body portions 7 can be mixed at a ratio of 1:1 to form a constituent material of the intermediate layers 8.

The multilayer coil C is constituted by a plurality of conductive layers overlapping in the lamination direction of the element body 2 and has an axis L parallel to the lamination direction of the element body 2. The multilayer coil C includes a coil winding portion (a winding portion) 12 and a pair of lead-out portions 13 extending from each end portion of the coil winding portion 12 to the end surfaces 2$a$ and 2$b$. Each of the lead-out portions 13 includes a lead-out conductor 14 and a connection conductor 15. Each conductive layer constituting the multilayer coil C is configured to contain a conductive material such as, for example, Ag or Pd.

Also, the multilayer coil component 1 includes a pair of external electrodes 4 and 5 disposed on both end surfaces 2$a$ and 2$b$ of the element body 2, respectively. The external electrode 4 is formed to cover the whole of one end surface 2$a$ and some of the four side surfaces on the end surface 2$a$ side and, is electrically connected to the lead-out portion 13 extending to the end surface 2$a$. The external electrode 5 is formed to cover the whole of the other end surface 2$b$ and some of the four side surfaces on the end surface 2$b$ side and is electrically connected to the lead-out portion 13 extending to the end surface 2$b$. The lamination direction of the element body 2 coincides with a direction in which the pair of end surfaces 2$a$ and 2$b$ face each other, and the pair of external electrodes 4 and 5 are respectively disposed at opposite end portions of the element body 2 in relation to the lamination direction. Further, the respective external electrodes 4 and 5 can be formed by causing the outer surfaces of the element body 2 to be coated with a conductive paste containing Ag, Pd, or the like as main components, followed by baking and then electroplating them. For the electroplating, Ni, Sn, or the like can be used.

As illustrated in FIG. 2, the multilayer coil component 1 described above can be formed by calcining a laminate in which multi-layered green sheets 11A, 11B, and 11C are overlapped.

Each of the green sheets 11A and 11B has a rectangular shape (a square shape in the present embodiment) and includes four sides which define the side surfaces of the element body 2. The green sheet 11A is a green sheet to be the first element body portion 6 described above, and components thereof have been adjusted to become a ferrite layer having a composition of the above-described first element body portion 6 after calcination. The green sheet 11B is a green sheet to be the second element body portions 7 described above, and components thereof have been adjusted to become a ferrite layer having a composition of the above-described second element body portions 7 after calcination. The green sheet 11C is a green sheet to be the intermediate layers 8 described above, and components thereof have been adjusted to become a ferrite layer having a composition of the above-described intermediate layers 8 after calcination.

The green sheets 11A and 11B are arranged such that the green sheets 11B are used for a lower stage portion and an upper stage portion of a green sheet laminate and the green sheets 11A are used for an intermediate stage portion thereof to form a structure in which the first element body portion 6 is adjacent to the pair of second element body portions 7 to be sandwiched therebetween in the lamination direction. The green sheets 11C are respectively interposed at portions in which there is switching between the green sheet 11A and the green sheet 11B in the lamination direction.

In each of the green sheets 11A, 11B, and 11C, a conductor pattern to be the above-described conductive layer is formed. Each conductor pattern can be formed by screen printing a conductive paste using screen plate making in which an opening corresponding to the pattern is formed.

Each conductor pattern 21 forming the coil winding portion 12 is formed in substantially a U shape. A substantially circular pad portion corresponding to a through-hole conductor is formed at each of one end portion and the other end portion of the conductor pattern 21. Each of the conductor patterns 21 is connected in series via the through-hole conductor with each of the phases shifted by 90 degrees to form the multilayer coil C in which the axis L extends in the lamination direction. The conductor pattern 21 is formed not only on the green sheets 11A in the intermediate stage portion of the green sheet laminate, but also on the green sheets 11B in the upper stage portion and the lower stage portion and the green sheets 11C corresponding to the intermediate layers 8.

A conductor pattern 24 forming the lead-out conductor 14 is formed as a substantially circular pad portion (a pad conductor) 26. The lead-out conductor 14 is constituted by the pad portion 26 and a through-hole conductor provided integrally with the pad portion 26. The pad portion 26 has a larger diameter than a pad portion of the coil winding portion 12 and is disposed coaxially with the axis L of the multilayer coil C formed of the coil winding portion 12. Each conductor pattern 24 is connected in series via the through-hole conductor, and forms the lead-out conductor 14 extending along the axis L of the multilayer coil C. Outer end portions of the lead-out conductor 14 are exposed to the end surfaces 2_a_ and 2_b_ in the lamination direction of the element body 2 and are connected to the external electrodes 4 and 5. The conductor pattern 24 is formed on the green sheets 11B in the upper stage portion and the lower stage portion of the green sheet laminate.

Conductor patterns 28 and 29 which form connection conductors connecting the lead-out conductor 14 and the coil winding portion 12 are provided between the conductor pattern 24 forming the lead-out conductor 14 and the conductor pattern 21 forming the coil winding portion 12. One end portion of each of the conductor patterns 28 and 29 is connected to the other end portion of the lead-out conductor 14 via the through-hole conductor, and the other end portion of each of the conductor patterns 28 and 29 is connected to an end portion of the coil winding portion 12 via the through-hole conductor. The conductor patterns 28 and 29 are formed on the green sheets 11B in the upper stage portion and the lower stage portion of the green sheet laminate.

In the element body 2 described above, as illustrated in FIG. 2, the coil winding portion 12 is provided to extend over the first element body portion 6 and the second element body portions 7 in the lamination direction. More specifically, the coil winding portion 12 is provided to extend from one second element body portion 7 (for example, the second element body portion on an upper side in the cross-sectional view of FIG. 1) to the other second element body portion 7 (for example, the second element body portion on a lower side in the cross-sectional view of FIG. 1) via the first element body portion 6 in the element body 2. When the coil winding portion 12 is provided to extend over the first element body portion 6 and the second element body portions 7, the first element body portion 6 and the second element body portions 7 contribute to respective coil characteristics of impedance, inductance, and a self-resonant frequency, and thus desired coil characteristics can be obtained by adjusting a ratio between the first element body portion 6 and the second element body portions 7 in the element body 2.

For example, when a dielectric constant of the element body 2 is lowered by adjusting a ratio between the first element body portion 6 and the second element body portions 7, stray capacitance decreases and an impedance around 1 GHz increases. Also, when a magnetic permeability of the element body 2 is lowered by adjusting a ratio between the first element body portion 6 and the second element body portions 7, a self-resonant frequency increases, impedance also increases, and inductance decreases. Also, when a magnetic permeability of the element body 2 is raised by adjusting a ratio between the first element body portion 6 and the second element body portions 7, a self-resonant frequency decreases, impedance also decreases, and inductance increases.

Also, in the multilayer coil component 1 described above, since the external electrodes 4 and 5 are respectively provided at the second element body portions 7 having a relatively low dielectric constant, high frequency characteristics of the multilayer coil component 1 are improved.

As illustrated in FIGS. 2 and 3A to 3D, in the element body 2, a stress alleviation portion 30 is provided in an inner region of the coil winding portion 12 of the multilayer coil C when viewed from the lamination direction. In the present embodiment, the stress alleviation portion 30 is a rectangular slit layer provided to be surrounded by the substantially U-shaped conductor pattern 21. In the present embodiment, the stress alleviation portion 30 is provided on the coil axis L of the multilayer coil C. The stress alleviation portion 30 can be formed by screen printing a coating material (lacquer) which volatilizes, for example, during a calcination process. In such a stress alleviation portion 30, since coupling between ferrite layers in the lamination direction is weak and the ferrite layers do not bind to each other when they shrink, a residual stress cannot be easily generated. When the stress alleviation portion 30 is a slit layer, the stress alleviation portion 30 may be a depleted layer with no material present inside or may be a material-filled layer into which zirconia or the like is filled.

In the present embodiment, the stress alleviation portion 30 is provided inside the first element body portion 6, inside the second element body portions 7, and at interfaces in which the first element body portion 6 and the second element body portions 7 are in contact with the intermediate layer 8.

Here, after intensive research, the inventors found that a stress caused by a difference in shrinkage ratio between the first element body portion 6, the second element body portions 7, and the multilayer coil C tends to be concentrated in the inner region of the multilayer coil C when viewed from the lamination direction. Therefore, as in the multilayer coil component 1 described above, the stress alleviation portion 30 is provided in the inner region of the multilayer coil C in which a stress tends to be concentrated to alleviate the stress in the inner region of the multilayer coil C, and thereby occurrence of cracking in the element body 2 can be suppressed.

The stress alleviation portion 30 may be provided only in the inner region of the multilayer coil C as in the above-described embodiment, or may be provided in a region overlapping the multilayer coil C or a portion of an outer region of the multilayer coil C in addition to the inner region of the multilayer coil C. When the stress alleviation portion 30 is provided only in the inner region of the multilayer coil C, a high strength of the element body as a whole can be realized and poor connection (for example, disconnection) due to the stress alleviation portion 30 being provided at a position of the through-hole conductor of the coil winding portion 12 can be suppressed.

Also, in the multilayer coil component 1, the intermediate layers 8 are provided between the first element body portion 6 and the second element body portions 7, and the intermediate layers 8 are formed of a mixed composition material including a ferrite element body material forming the first element body portion 6 and a ferrite element body material forming the second element body portions 7. Therefore, a difference in shrinkage ratio between the first element body portion 6 and the second element body portions 7 is diminished by the intermediate layers 8, and thereby occurrence of cracking or breakage during mounting is suppressed. The stress alleviation portion 30 can be provided in contact with the intermediate layers 8 in the lamination direction.

The disclosure is not limited to the above-described embodiment and can be modified in various ways.

Figure 4:
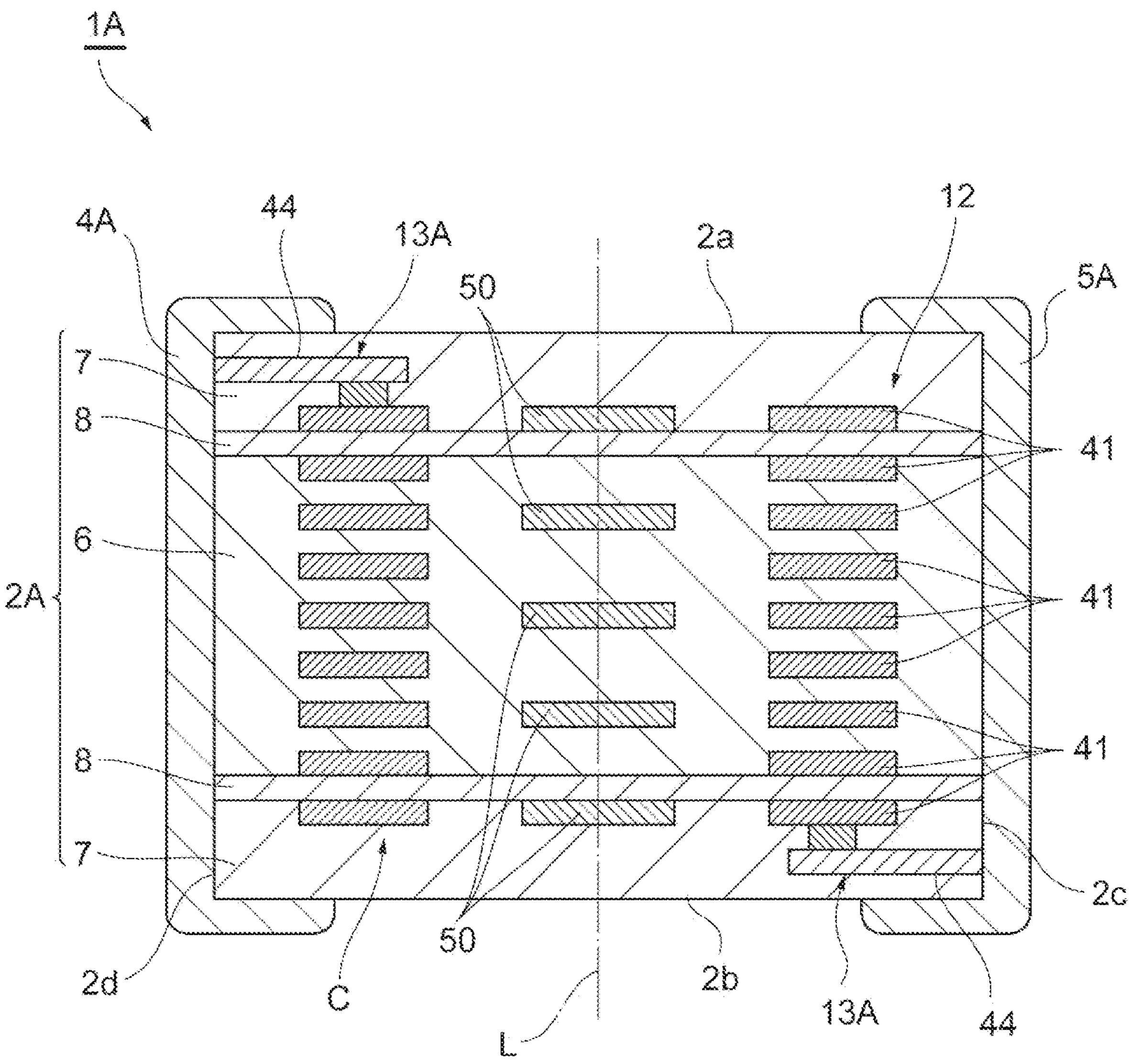
FIG. 4 is a schematic cross-sectional view illustrating a multilayer coil component in a different aspect.

For example, in the above-described embodiment, the multilayer coil C is a so-called longitudinal winding coil in which the external electrodes 4 and 5 are disposed on the end surfaces 2*a* and 2*b* of the element body and an extending direction of the axis L (axial direction) of the multilayer coil C extends in the lamination direction of the element body 2, but the multilayer coil C may be a so-called lateral winding coil. That is, as illustrated in FIG. 4, a multilayer coil component 1A having a configuration in which external electrodes 4A and 5A are disposed on the side surfaces 2*c* and 2*d* of the element body, and lead-out portions 13A of the multilayer coil C extend from end portions of the coil winding portion 12 to the side surfaces 2*c* and 2*d* on which the external electrodes 4A and 5A are provided may be employed. In the multilayer coil component 1A, particularly a shape of the lead-out portions 13A is different from a shape of the lead-out portions 13 of the multilayer coil component 1 described above.

Figure 5:
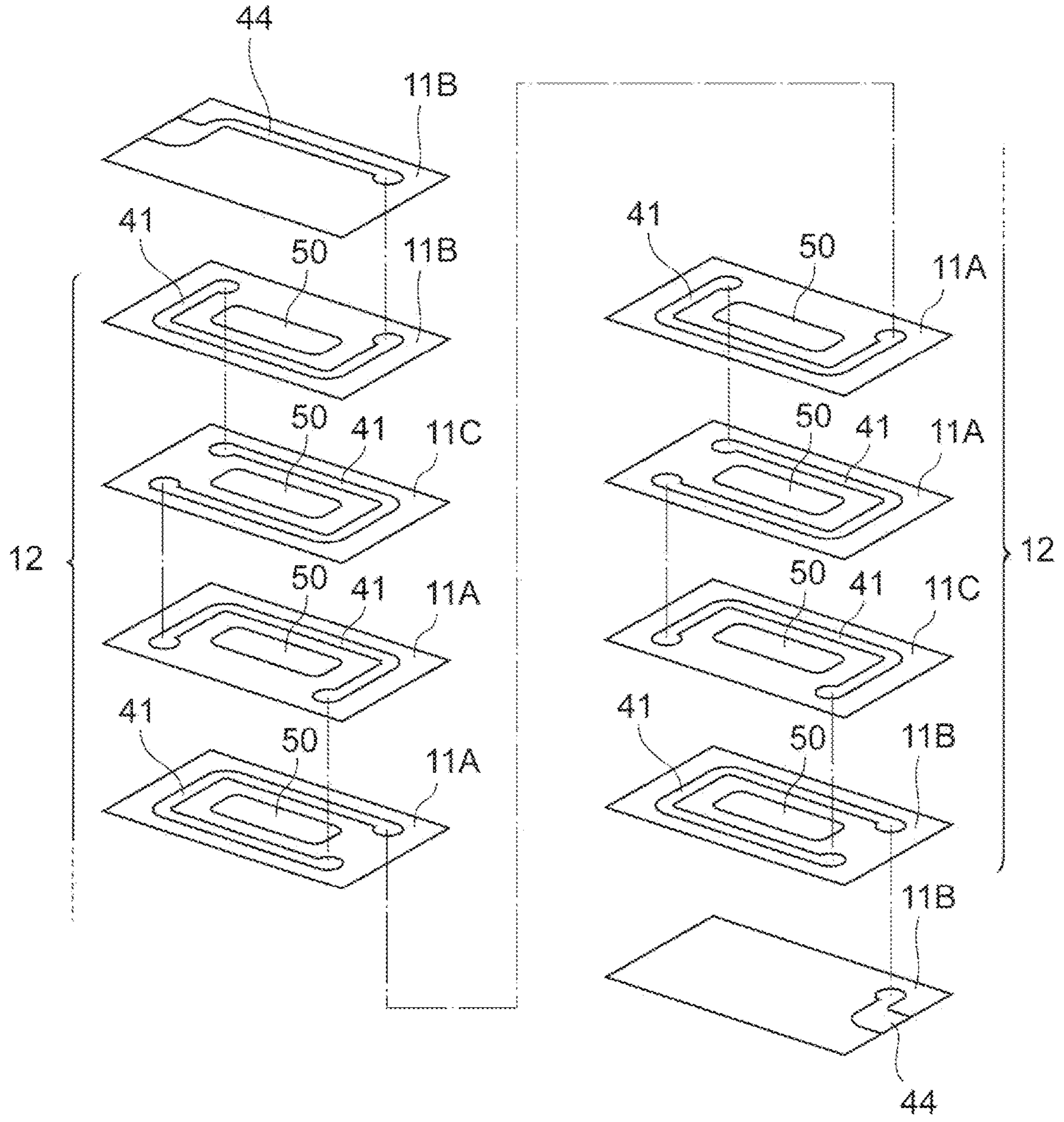
FIG. 5 is a perspective view illustrating a lamination state of green sheets when the multilayer coil component illustrated in FIG. 4 is manufactured.
Figure 6D:
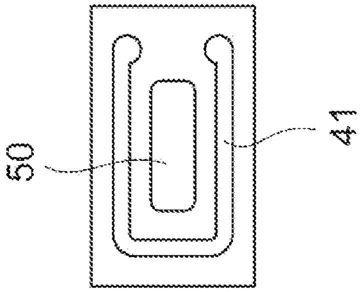
FIGS. 6A to 6D are plan views illustrating a conductor pattern and a slit layer in each layer of the multilayer coil component illustrated in FIG. 4.
Figure 6C:
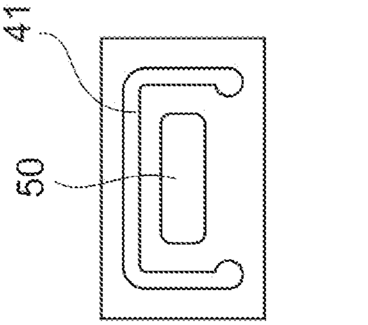
Figure 6B:
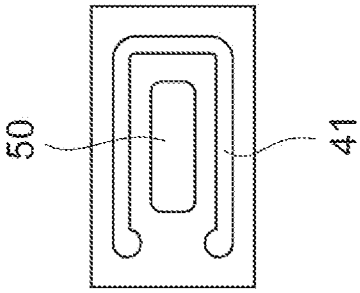
Figure 6A:
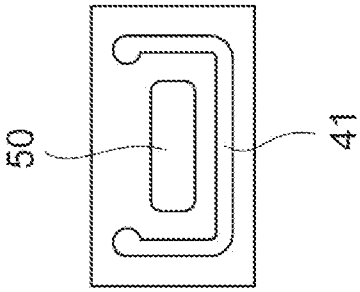

As illustrated in FIG. 5, the multilayer coil component 1A can be formed by calcining a laminate in which multi-layered green sheets 11A, 11B, and 11C are overlapped. A conductor pattern 44 that forms each of the lead-out portions 13A of the multilayer coil component 1A is configured such that one end is connected to a pad portion of a conductor pattern 41 corresponding to an end portion of the coil winding portion 12 via a through-hole conductor, and the other end extends to one side corresponding to the side surfaces 2*c* and 2*d*.

The conductor pattern 41 forming the coil winding portion 12 of the multilayer coil component 1A is formed in substantially a U-shape as in the conductor pattern 21 described above. Thus, as illustrated in FIG. 5 and FIGS. 6A to 6D, in the element body 2 of the multilayer coil component 1A, a stress alleviation portion 50 is provided in an inner region of the coil winding portion 12 of the multilayer coil C when viewed from the lamination direction. In an aspect illustrated in FIGS. 6A to 6D, the stress alleviation portion 50 is a rectangular slit layer provided to be surrounded by the substantially U-shaped conductor pattern 41.

The element body is not limited to one formed of ferrite and may be one formed of a material other than ferrite (for example, a ceramic magnetic material or the like). The element body may have a structure (a sandwich structure) in which the second element body portion is adjacent to a pair of first element body portions to be sandwiched therebetween in the lamination direction. The element body may have a multilayer structure in which at least the first element body portion and the second element body portion are included and may not have a sandwich structure.

The number of stress alleviation portions is not limited to that described above and can be increased or decreased as appropriate. The disclosure may have an aspect in which the stress alleviation portion is provided only in the inner portion of the first element body portion, an aspect in which the stress alleviation portion is provided only in the inner portion of the second element body portion, or an aspect in which the stress alleviation portion is provided only in the interfaces in which the first element body portion and the second element body portion are in contact with the intermediate layer.

What is claimed is:

1. A multilayer coil component comprising:

an element body having a multilayer structure including:

a first element body portion formed of a first material; and a second element body portion laminated on the first element body portion and formed of a second material having a composition different from that of the first material;

a multilayer coil having an axis parallel to a lamination direction of the element body;

a stress alleviation portion provided in an inner region of an inner edge of the multilayer coil when viewed from the lamination direction, wherein the stress alleviation portion is separated from all conductor patterns forming the multilayer coil by either the first material or the second material constituting the element body, wherein the stress alleviation portion is formed in the same layer as the conductive pattern constituting the multilayer coil, and wherein the stress alleviation portion is provided on a coil axis of the multilayer coil.

2. The multilayer coil component according to claim 1, wherein the element body has a multilayer structure in which one of the first element body portions and the second element body portions sandwich the other thereof in the lamination direction.

3. The multilayer coil component according to claim 1, further comprising an intermediate layer formed of a mixed composition material including the first material and the second material between the first element body portion and the second element body portion.

4. The multilayer coil component according to claim 3, wherein the stress alleviation portion is in contact with the intermediate layer in the lamination direction.

5. The multilayer coil component according to claim 3, wherein the first material is a first ferrite material, and the second material is a second ferrite material different from the first ferrite material.

6. The multilayer coil component according to claim 3, wherein the first material is a first ceramic magnetic material, and the second material is a second ceramic magnetic material different from the first ceramic magnetic material.

7. The multilayer coil component according to claim 1, wherein the stress alleviation portion is a slit layer.

8. The multilayer coil component according to claim 1, wherein the stress alleviation portion is provided only in the inner region of the multilayer coil when viewed from the lamination direction.

9. The multilayer coil component according to claim 1, wherein the stress alleviation portion is a rectangular slit layer.

10. The multilayer coil component according to claim 1, wherein the stress alleviation portion does not overlap with the multilayer coil in the lamination direction.

11. The multilayer coil component according to claim 1, wherein the stress alleviation portion is a material-filled layer into which zirconia is filled.

* * * * *